(12) United States Patent
Johnson

(10) Patent No.: US 9,805,535 B2
(45) Date of Patent: Oct. 31, 2017

(54) CUSTOMIZABLE COIN HOLDER

(71) Applicant: Craig M. Johnson, Long Lake, MN (US)

(72) Inventor: Craig M. Johnson, Long Lake, MN (US)

(*) Notice: Subject to any disclaimer, the term of this patent is extended or adjusted under 35 U.S.C. 154(b) by 160 days.

(21) Appl. No.: 14/534,716

(22) Filed: Nov. 6, 2014

(65) Prior Publication Data
US 2016/0133080 A1  May 12, 2016

(51) Int. Cl.
| | |
|---|---|
| G07D 9/00 | (2006.01) |
| G06Q 30/02 | (2012.01) |
| G06Q 30/06 | (2012.01) |
| B42F 5/04 | (2006.01) |
| B42F 13/16 | (2006.01) |
| A47G 1/12 | (2006.01) |

(52) U.S. Cl.
CPC ............. *G07D 9/002* (2013.01); *B42F 5/04* (2013.01); *B42F 13/16* (2013.01); *G06Q 30/0277* (2013.01); *G06Q 30/0633* (2013.01); *A47G 1/12* (2013.01)

(58) Field of Classification Search
CPC ..... B42F 5/02; B42F 5/04; A47G 1/12; G09F 5/04; G07D 9/002; A45C 2001/102
USPC ........... 206/0.81, 0.83, 0.84, 459.5, 445, 0.8
See application file for complete search history.

(56) References Cited

U.S. PATENT DOCUMENTS

| | | | | | |
|---|---|---|---|---|---|
| 1,719,962 | A | * | 7/1929 | Beistle | G09F 5/042 206/0.8 |
| 2,258,535 | A | * | 10/1941 | Buranelli | G07D 9/004 206/0.83 |
| 2,428,498 | A | * | 10/1947 | McWilliams | B42F 5/00 206/0.83 |
| 2,449,204 | A | * | 9/1948 | Curtis | G09F 5/04 206/0.83 |
| 2,457,998 | A | * | 1/1949 | Winter | A45C 1/02 206/0.82 |
| 2,521,792 | A | * | 9/1950 | Hollander | B42F 5/02 206/0.83 |
| 2,568,625 | A | * | 9/1951 | Harvey | G09F 5/04 206/464 |

(Continued)

OTHER PUBLICATIONS

Air-Tite Holders Quality Protection for Your Collection—vol. 4 Brochure; www.airtiteholders.com.

(Continued)

*Primary Examiner* — J. Gregory Pickett
*Assistant Examiner* — Gideon Weinerth

(57) ABSTRACT

A coin holder device 12 that includes a transparent front sheet 20 that contains receptacles 18 and first and second major surfaces 28 and 30. The receptacles 18 are recessed into the sheet 20 to project out from the second major surface 30. A backer sheet 22 has first and second major surfaces 32 and 34 and openings 36 that extend through the sheet 22. The openings 36 correspond in location to the receptacles 18 in the front sheet 20. The backer sheet 22 is removeably positioned over the receptacles 18, enabling the second major surface 30 to be juxtapositioned against the first major surface 32. The first major surface 32 has coin indicia 38 proximate the openings 36 indicative of the coin to be placed in the respective receptacle 18. The coin holding device is beneficial in that it allows custom-tailored coin holders to be supplied easily over the internet.

20 Claims, 4 Drawing Sheets

(56) References Cited

U.S. PATENT DOCUMENTS

| | | | | |
|---|---|---|---|---|
| 2,931,494 | A * | 4/1960 | Pfohl | B65D 73/0014 206/462 |
| 3,064,805 | A * | 11/1962 | Bains | B42F 5/00 206/0.83 |
| 3,178,014 | A * | 4/1965 | Goldwasser | 206/0.83 |
| 3,217,866 | A * | 11/1965 | Phelps | 206/0.83 |
| 3,913,732 | A * | 10/1975 | Peterson | G09F 5/04 206/0.83 |
| 4,063,639 | A * | 12/1977 | Grant | A47G 1/12 206/0.82 |
| 4,091,927 | A * | 5/1978 | Lunsford | B65D 75/32 206/459.5 |
| 4,402,399 | A * | 9/1983 | Friess | A47G 1/12 206/0.83 |
| 4,425,997 | A | 1/1984 | Grant | |
| 4,971,192 | A | 11/1990 | Donnell | |
| 5,119,574 | A | 6/1992 | King | |
| 5,150,792 | A | 9/1992 | Munroe | |
| 5,191,972 | A * | 3/1993 | Helzer | A47G 1/12 206/0.8 |
| 5,960,411 | A | 9/1999 | Hartman | |
| 6,039,495 | A * | 3/2000 | Zimmerman | B42F 13/40 206/461 |
| 6,318,547 | B1 * | 11/2001 | Pianezzola | G07D 9/002 206/0.81 |
| 6,366,899 | B1 * | 4/2002 | Kernz | G06F 17/30274 |
| 6,607,075 | B1 * | 8/2003 | Galvani | A47G 1/12 206/0.84 |
| 6,643,666 | B1 * | 11/2003 | Kernz | G06F 17/30274 |
| 6,969,091 | B2 | 11/2005 | Hilicki | |
| 7,347,453 | B1 | 3/2008 | Hilicki | |
| 7,837,031 | B2 | 11/2010 | Counts | |
| 7,926,716 | B2 | 4/2011 | Hanson | |
| 8,215,479 | B2 * | 7/2012 | Willms | B42F 5/00 206/0.8 |
| 8,550,239 | B2 | 10/2013 | Nakonechny | |
| 2010/0313037 | A1 * | 12/2010 | Ward | G06Q 30/06 713/189 |
| 2011/0068016 | A1 * | 3/2011 | Macor | G07D 9/002 206/0.81 |

OTHER PUBLICATIONS

Book of Silver AmericanThe Beautiful 5oz Silvers Album; Feb. 21, 2014; http://www.wizardcoinsupply.com/book-of-silver-american-the-beautiful-5oz-silvers-album.html.
Intercept Shield Album: Presidential Dollars w/Proofs; Feb. 21, 2014; http://wizardcoinsupply.com/intercept-shield-album-presidental-dollars-w-proofs.html.
Lighthouse Certified Coin Album (set of 2); Feb. 21, 2014; http://www.wizardcoinsupply.com/certified-lighthouse-pages.html.
Plastic Coin Holder Tray made by US Mint.
Design U.S. Appl. No. 29/509,519, entitled "Dual Layered Coin Holder", filed Nov. 18, 2014.

* cited by examiner

CUSTOMIZABLE COIN HOLDER

The present invention pertains to a coin holder that is customizable to accommodate and designate coins of various sizes, origins, and years. The present invention further pertains to a system and method of providing coin holders to persons who seek to buy them.

BACKGROUND

Since the creation of the Federal Reserve banking system in the United States of America in 1913, the Constitutional, gold- and silver-backed currency has been, for all practical purposes, replaced with federal reserve notes. The latter being an un-backed, flat currency, issuable upon governmental and banking debt, has resulted in a dramatic expansion of the monetary base. This money supply expansion is a tax, commonly known as "inflation", which brings about price increases throughout the economy and the removal of the precious metal coinage from circulation. This replacement of a sound currency for one of lesser value through governmental action or force is known as Gresham's Law. The net result is the hoarding of the undervalued currency or coinage in favor of the overvalued currency by persons who seek to preserve their wealth from losses through the governmentally-imposed inflation tax.

Because inflation has been so regular since the Federal Reserve was first organized, essentially all precious metal coinage and most obsolete coinage has been taken out of circulation and is being held by collectors. Many of these previously circulated coins are now stored in safety deposit boxes or in safes of their owners. Collectors generally enjoy assembling their coins in "sets". There are generally accepted definitions of which specific coins constitute a given "set", but the term is subjective and therefore is open to individual interpretation. Over the years, many manufacturers have produced holders that collectors have used to organize and protect their collections. When storing coins, the owners often attempt to keep the coins in holders that allow the owners to quickly identify and evaluate their inventory. These holders come in a variety of configurations but commonly take the form of a series of slots or receptacles on a page or sheet—see, for example, U.S. Pat. Nos. 8,177,057, 5,150,792, 4,971,192, and 4,425,997. Coin holders also may be placed in a book or in a binder—see, for example, U.S. Pat. Nos. 7,837,031, 7,347,453, and 6,969,091. Coin holders that secure coins within capsules in a page of a book are available for purchase on the website www.bookofsilver.com. Coin holders may be provided with some sort of indicia at the receptacle for identifying the particular coin placed therein—see, for example, the website at www.lighthouse.us.

Some coins, because of their rarity, condition, or intrinsic value take on extra value in excess of their face value (these coins are known as "numismatic coins"); therefore it is imperative to be able to locate them within the total inventory. Numismatists collect coins for a variety of reasons, including aesthetics, historical significance, as a store of value, and for sentimental or other personal reasons. Conscientious numismatists look for efficient ways to organize and store their collections. Some collectors examine coins in minute detail to determine die variety and assemble collections on that basis. In short, the reasons for establishing a collection, and what the constituent parts of a collection should be, are highly subjective.

A problem with known coin holders that use an indicia to designate or identify the coin is that the indicia is crafted in advance by the manufacturer. The coin collector thus does not have the opportunity to provide coin designations specifically for the coins that they own. When the collector does not have a coin for the receptacle identified by the manufacturer, that spot in the coin holder goes vacant. And if the collector has more coins than those designated by the manufacturer's coin holder, the collector must find another location for the orphan coins or re-label some of the receptacles themselves to provide a properly labeled receptacle where the orphan coin may be kept. Such relabeling by the owner detracts from the cosmetic appearance of the original holder. Another drawback of existing coin holders is that the manufacturer is not able to easily deliver a custom made coin holder to a prospective customer. Each coin owner has a particular inventory of coins that they generally like to store, but the conventional holders available today are unable to rapidly match a holder to that customer's specific coin inventory.

SUMMARY OF THE INVENTION

The present invention provides a coin holding device that overcomes the drawbacks noted above with respect to existing coin-holders. The coin holder of the invention comprises a front sheet and a backer sheet. The front sheet is transparent and contains a series of receptacles and has first and second major surfaces. The receptacles are recessed into the front sheet so as to project out from the second major surface. The backer sheet too has first and second major surfaces but has a series of openings located therein. The openings correspond to the location of the receptacles so that the backer sheet is able to be removeably positioned over the projecting receptacles, enabling the second major surface of the front sheet to be juxtapositioned against the first major surface of the backer sheet. The backer sheet further comprises indicia proximate one of more of the openings on the first major surface indicative of a coin that is intended to be placed in that particular receptacle.

The present invention differs from known coin holders in that it has a removeable backer sheet that can be seen through the front sheet so that the pre-printed indicia is visible on the front of the coin holder. This visibility enables the user to quickly identify the coin that is placed in that receptacle. It also allows the indicia on the backer sheet to be customized by the end user or by the manufacturer per the customer's request. The present invention therefore is beneficial in that the coin holders can be tailored to accommodate the existing or anticipated collection of a particular coin owner. Coin holders provided heretofore had no such accommodation. The user thus had to tailor their collection to the holder rather than the other way around. The tailoring of the coin holder to the user or owner's preference can be accomplished over the internet or telephone where the purchaser specifies the particular coin indicia and optionally the receptacle sizes that they desire for their coin holder.

Glossary

The terms set forth below will have the meanings as defined:

"backer sheet" means a structure that is much larger in first and second dimensions than in a third and that is located behind another sheet-like article when in an assembled condition with the other sheet-like article;

"coin holder device" means a device that is designed to secure a plurality of coins within it;

"coin indicia" means a combination of words and/or numerals that together identify a particular coin;

"front sheet" means a structure that is much larger in first and second dimensions than in a third and that is designed for being placed in front of another sheet-like article;

"juxtapositioned" means being placed next to one another but not necessarily in a contacting relationship;

"major surface" means a surface that has an extended surface area relative to other surfaces of the same object;

"order" means the requesting of a product from a seller in exchange for payment to the seller;

"receptacle" means a recessed space or other arrangement sized to accommodate a coin or a coin capsule;

"removeably" and "removeable" means having the ability to be manually separated from another object or part without destroying one or both objects or parts;

"series" means in an orderly arrangement; and

"transparent" means being sufficiently light transmissible to enable coin indicia to be readily visible therethrough.

DETAILED DESCRIPTION OF PREFERRED EMBODIMENTS

In practicing the present invention, a coin collector can now obtain a custom coin holding device, which may be fashioned to accommodate the coins that the collector owns. The coin collector can inform the coin holder manufacturer of the coins that the collector would like to have identified in his or her coin holder. The manufacture can then custom tailor the coin indicia on the backer sheet to indicate the coins so designated by the coin collector. The inventive coin holding device is structured to allow for the coin indicia to be seen through the front sheet and for the respective coin to fit into the receptacle so identified on the backer sheet.

Figure 1:
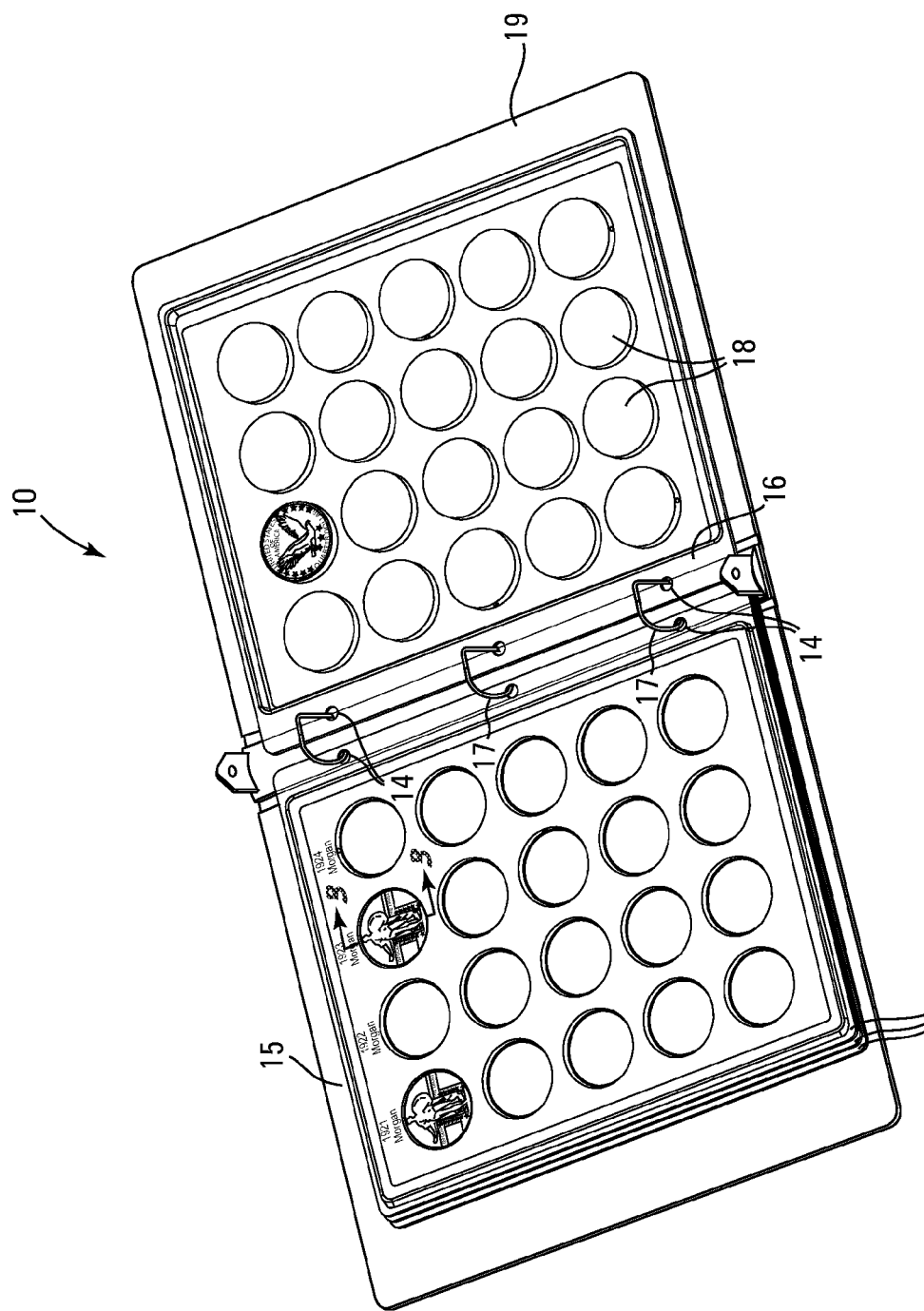
FIG. 1 is a front perspective view of a coin holding binder 10 in accordance with the present invention.

FIG. 1 shows a coin holding binder 10 that has a number of coin holding devices or pages 12 placed therein. The coin holding devices 12 each have holes 14 provided along the inward edge 16 sized to enable the coin holding devices 12 to be held within the binder rings 17. The binder 10 may contain approximately 1 to 10 pages of the coin holding devices 12, more typically about 3 to 6 coin holding devices 12 within the binder between opposing front and back covers 15 and 19. Each coin holding device 12 includes a series of receptacles 18, which may be arranged in rows and/or columns. The receptacles 18 are generally cylindrical in shape: they have a generally constant diameter and have a depth that is generally greater than a typical coin or a typical coin capsule. The receptacle depth generally is about 0.1 to 0.4 inches in depth, more typically about 0.15 to 0.35 inches in depth. The receptacle inner diameter may vary depending on the type of coin that is intended to be stored, but typically would correspond to outer diameter of the most common capsules, which outer diameters generally are about 1.25, 1.50 and 1.75 inches in diameter. The capsules typically are provided in small, medium, and large sizes of which the 1.25, 1.50 and 1.75 inch sizes are respectively representative. Typically, there are about 20 to 30 receptacles arranged in series in rows and/or columns on each coin holding device. Coin capsules suitable for use in connection with the present invention include Air-Tite™ brand coin capsules available from AirTiteHolders.com. Air-Tite™ coin holders are described as being made of acrylic and contain a non-yellowing agent but lack PVC, which may adversely affect coin appearance. The coin capsule desirably is hard and clear and includes two pieces that snap together to provide long-term protection for the encapsulated coin. The capsule may have a variable inside diameter while having a generally consistent outside diameter. Since there are only a few sizes of coin capsules, coin collectors can store almost any coin that has ever been minted within a few of the capsules that are available. Capsules, in particular, offer numismatists an excellent way to protect their coins. Before the present invention, however, the coin holders into which the coins are stored offer limited ways or options for organizing the encapsulated coins. The present invention enables a coin collector to either buy a stock titled backer sheet with pre-determined indicia for a given collection or to design a custom album for their collection. In the present invention, the coin holder also may be fashioned to allow coins to be inserted directly into the page without capsules. While known capsules have provided an excellent protection for individual coins, there has not been an effective way to organize the coins into a coherent collection tailored to the collector's present collection or to his or her intended collection. In the present invention, a collector may buy, for example, pre-printed albums for standard sets such as for Morgan Silver Dollars, Indian Cents, or Buffalo Nickels and also create custom albums for other sets.

Figure 2:
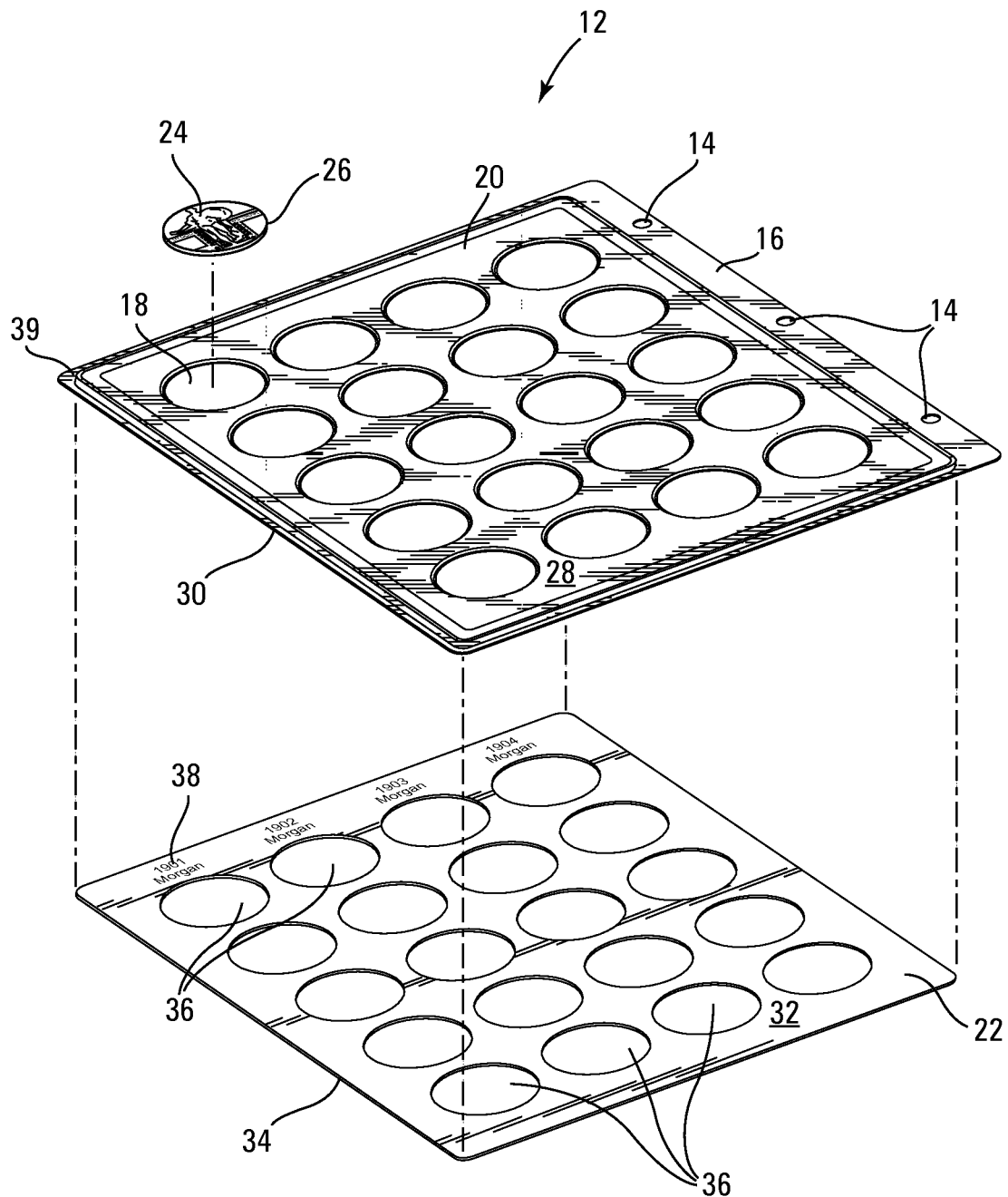
FIG. 2 is a front perspective view of a coin holding device 12 in accordance with the present invention, showing the front sheet 20 separated from the backer sheet 22.

FIG. 2 shows a coin holding device 12 that has the front sheet 20 separated from the backer sheet 22. Additionally, a coin 24 in a capsule 26 is shown removed from its receptacle 18. As can be seen, the front sheet 20 contains a series of receptacles 18 and has first and second major surfaces 28 and 30. The receptacles 18 are recessed into the sheet 20 residing beneath the first major surface 28 so as to project out from the second major surface 22. The backer sheet 22 also has first and second major surfaces 32 and 34, respectively, but has a series of openings 36 located therein. The openings 36 correspond to the location of the receptacles 18 so that the backer sheet 22 can be properly positioned over the projecting receptacles 18, enabling the second major surface 30 of the front sheet 20 to be juxtapositioned against the first major surface 32 of the backer sheet 22. The second major surface 30 of the front sheet 20 may contact the first major surface 32 of the backer sheet 22, although it 30 does not necessarily need to make such contact. There may be another layer or spacer located therebetween, provided that such layer does not interfere with the transparency of the front sheet 20. The backer sheet 22 further comprises coin indicia 38 proximate one of more of the openings 36 on the first major surface 32, indicative of a coin 24 that is intended to be placed in that particular receptacle 18. The front sheet 20 is transparent so that the indicia 38 located on the first major surface 32 of the backer sheet 22 can be seen through the front sheet 20. The backer sheet 22 typically is opaque. The color of the backer sheet major surface 32 is different from the coin indicia 38 so that the coin indicia 38 is readily apparent on the first major surface 32 of the backer sheet 22. Typically the first major surface 32 of the backer sheet 22 is white, while the coin indicia 38 is black or blue. The front sheet may be made of a vacuum-molded plastic and may include a molded border 39 to improve structural integrity and aesthetic appearance of the device 12. Not including bends in the plastic, the thickness of the transparent front sheet is generally about 0.025 inches to 0.04 inches. The front sheet may be comprised of a clear plastic such as polyethylene terephthalate (PET) and polyethylene terephthalate glycol modified (PETG). Although the coin holding device 12 shown in FIG. 2 is shown having receptacles 18 of the same diameter, these diameters may be varied, typically from row-to-row or column-to-column. That is, each row or column may have the same diameter but an adjacent row or column may be different. One row, for example, may have outer diameters of about 1.25 inches for each of the receptacles 18 in that row, whereas an adjacent row may have outer diameters of 1.5 inches for each of the receptacles 18 in that row.

Figure 3:
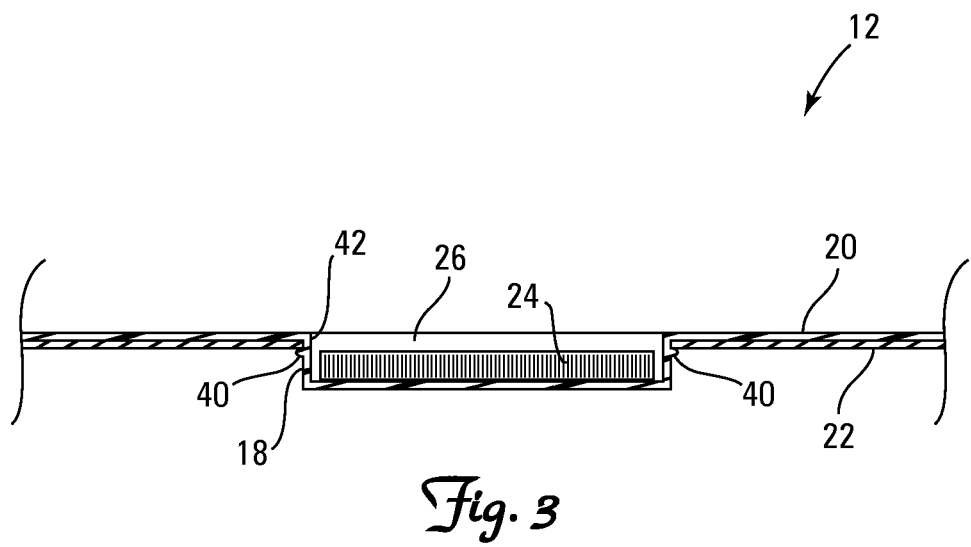
FIG. 3 is a cross-section of a coin holding device 12 taken along lines 3-3 of FIG. 1.

FIG. 3 shows a coin 24 in a capsule 26 in a receptacle 18. As shown, the inner diameter of the receptacle 18 is fashioned to be approximately the same as the outer diameter of the coin capsule 26. Preferably, the diameters are the same or the inner diameter of the receptacle 18 is slightly smaller than the outer diameter of the capsule 26. By sizing the receptacle 18 as such, a friction fit can be established between the coin capsule 26 and the receptacle 18. The friction fit should be sufficient to enable the capsule 26 to be retained in the receptacle 18 during normal handling of the coin holding device. The backer sheet 22 is shown juxtapositioned against the front sheet 20. The openings 36 (FIG. 2) in the backer sheet 22 enable the receptacles 18 in the front sheet 20 to penetrate the backer sheet 22 at the openings 36 so that the first major surface 32 backer sheet 22 can be placed in face-to-face contact with the second major surface 30 of the front sheet 20. Such face-to-face contact provides a clean appearance to the resulting coin holding device 12, and it enables the indicia 38 (FIG. 2) to be clearly visible through the front sheet 20. The coin holding device 12 also can be provided with a means to help retain the backer sheet 22 in mating contact with the front sheet 20. The front sheet 20 can be mated to the backer sheet 22 such that the two can be separated if desired but will not be separated through normal use or handling, such as by turning pages 12 in the binder 10 (FIG. 1). The backer sheet 22 may be removeably joined to the front sheet 20 on the backside of the front sheet 20. Such a retention means may include one or more protuberances 40, which extend radially outward from the outer surface of the cylindrically shaped receptacle 18. The protuberances 40 may be continuous or discontinuous. If the former, the protuberance 40 can take the shape of a ring that extends radially from the outer surface of the receptacle 18 360° around the circumference. If the latter, the protuberances 40 may be one or more bumps extending from the receptacle. There may be 1, 2, 3, or 4 of such protuberances extending from each receptacle. In lieu of protuberances, the retention means may take the form of non-circular openings 36 in the backer sheet 22. The opening circumference 42 may be fashioned to have a segment or chord line that is linear rather than curved. The linear segment creates an interference or friction fit between the front sheet 20 and the backer sheet 22. The frictional engagement occurs as the receptacle penetrates through the openings 36 (FIG. 2) in the backer sheet. The linear segments may be located at different positions around each generally circular opening. For example, one linear segment could be placed at the 12:00 o'clock position on a first opening while being at a 3:00 o'clock position at a second opening, and at a 6:00 o'clock position at a third opening. The backer sheet may also be secured with adhesives placed between the front sheet and backer sheet, or adhesive tabs, placed on the front sheet but extending over the backer sheet to hold it in place.

Figure 4:
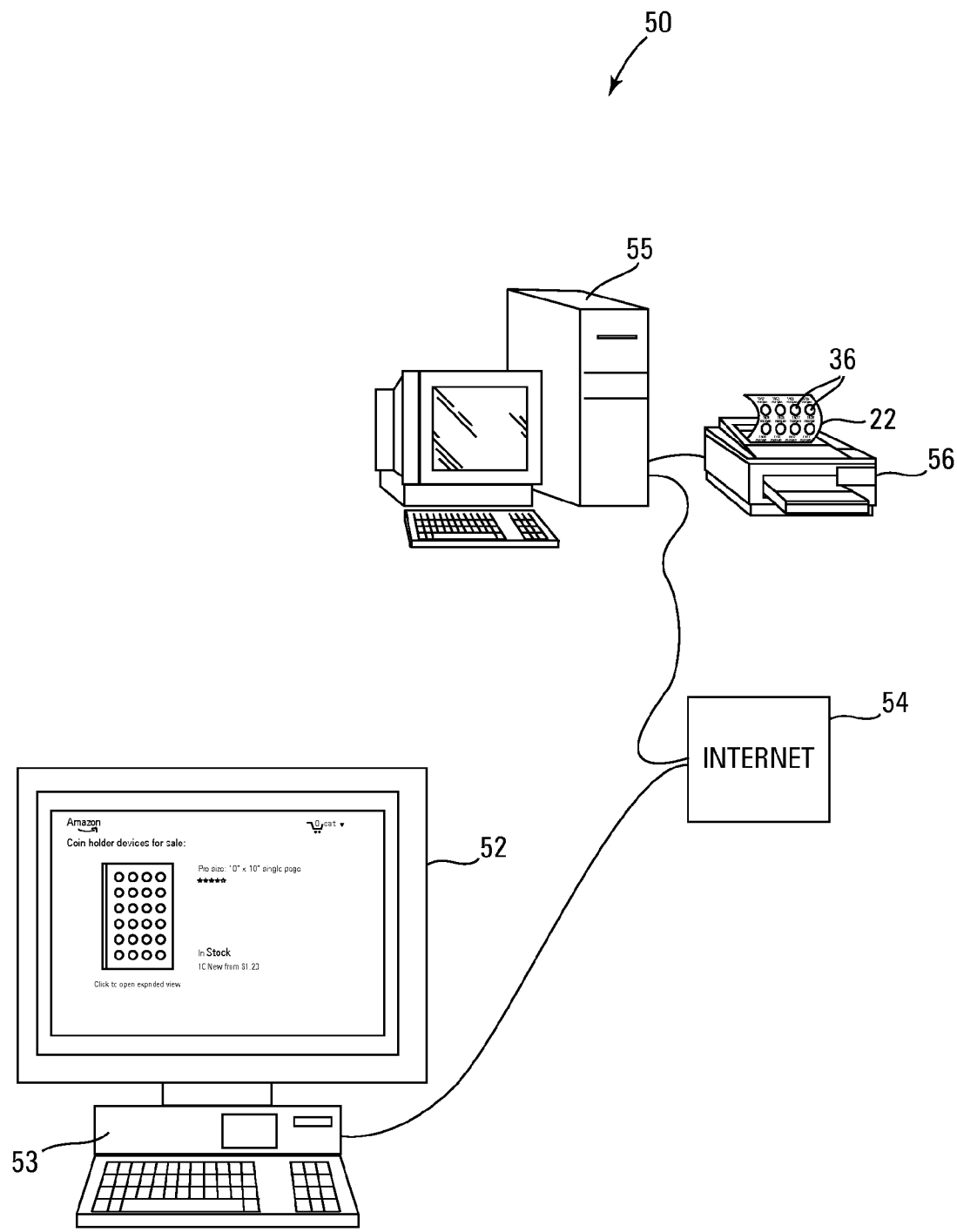
FIG. 4 is a schematic view of a system and/or method 50 for ordering a custom coin holding device over the internet, in accordance with the present invention.

FIG. 4 shows a system 50 for providing coin holder devices to a customer. The system 50 includes a website 52 that advertises custom made coin holding devices are available to be purchased. The website itself may be fashioned for taking an order for a coin holder device from a customer, or contact information can be provided where the customer can call-in the information needed to process the order. The website 52 may include a page or a location where the customer can input information for coin indicia that is desired to appear on the coin holder device ordered by the customer. The website may include a template of a virtual coin holder device of the present invention. The template may be provided with blank spaces adjacent each receptacle for the customer to fill in the desired coin indicia. The coin indicia then appears on the resulting ordered device 12 (FIG. 2) adjacent to a coin receptacle sized to receive that particular coin. The coin holding device can be supplied with the coin capsule that is sized to receive that particular coin and to fit in that particular receptacle. The website can be located on one of the many computers 53 connected to the internet 54. The coin indicia can be printed on a backer sheet 22 as described above in reference to the coin holder device 12 previously described (FIGS. 1-3). The inventive system 50 also includes a computer 55 that receives information pertaining to the order from the customer. This information can be received over the internet 54. Purchases can be made and processed according to the method described in U.S. Pat. No. 5,960,411 to Hartman et al.; see also, U.S. Pat. No. 7,926,716 to Hanson. Alternatively, the information may be received over the telephone. Connected to the computer 55 is a printer 56 that prints a backer sheet 22 that displays the coin indicia inputted by the customer. The backer sheet 22 has a thickness that allows for the sheet to be passed through a printer. To enable the backer sheet to accommodate most printers that are available today, the backer sheet typically has a thickness of less than 0.5 millimeters (mm), more typically less than 0.4 mm, and greater than 0.3 mm. The indicia on the backer sheet 22 may be tailored to the customer's request as described above in FIGS. 1-3 in reference to the inventive coin holder device 12. The openings in the backer sheet may be provided before or after printing. One method is to create the openings using a die cutting press after the backer sheet has been run through the printer.

EXAMPLE

In purchasing a coin holder of the present invention, a customer would go to the website advertising coin holders available for sale. This customer may be one who has a collection that is not easily accommodated by commercially available coin holder devices that are on the market today. On the website, there would be options to buy a standard coin holding device or a customizable coin holder device. A standard device would have the coin indicia printed on the backer sheet according to the sell or manufacturer's specifications. When the customer has a collection that is not easily placed within available coin holder devices, the customer may opt to have a custom coin holding device provided for purchase. When clicking on the option, the customer is directed to a webpage, which indicates that the coins must be placed in capsules of one of three sizes. The sizes may be small, medium, or large as described above.

The sizes (inner diameters) for each of these capsules would be provided on the website so that the customer can ascertain which size capsule fits his or her coins. Once the customer has selected the size capsule that they expect to use, the customer is then provided with a webpage that shows a template of a backer sheet. The template will be a virtual backer sheet, resembling the one that the customer intends to purchase. There will be blank spaces on the template for the customer to fill in with coin indicia. The customer types in the desired coin indicia into the blank spaces and hits a button on the webpage, indicating that the template has been completed. The customer then will be asked if they would like to complete another template for another page of a coin holder device. If they say "yes" another template will be provided for the customer to complete. If they indicate "no", then can be given an option to be taken to the check out procedure or to further shop on the website. The customer, for example, may want to purchase a binder for the coin holder devices that he or she is buying. Once the customer has completed shopping, the customer may check out using PayPal® or their credit card.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. A coin holder device that comprises:
   (a) a transparent front sheet that contains a series of receptacles and first and second major surfaces, the receptacles being recessed into the front sheet so as to project out from the second major surface of the front sheet, said receptacles having one or more radially extending protuberances on their exterior surface; and
   (b) a backer sheet that has first and second major surfaces and a series of openings located therein, the openings corresponding to the location of the receptacles, the backer sheet being able to be removably positioned over the receptacles so that the second major surface of the front sheet is juxtapositioned against the first major surface of the backer sheet, the backer sheet further comprising coin indicia proximate one or more of the openings on the first major surface of the backer sheet, the coin indicia being visible through the transparent front sheet when viewing the coin holder from the front and being indicative of a coin that may be placed in the receptacle.

2. The coin holder device of claim 1, wherein at least one of the front sheet or backer sheet has holes at the margin that are designed to allow for the coin holder device to be removably inserted into a ringed binder.

3. The coin holder device of claim 1, wherein the receptacles have a depth that is about 0.1 to 0.4 inches in depth.

4. The coin holder device of claim 1, wherein the receptacles have a depth that is 0.15 to 0.35 inches in depth.

5. The coin holder device of claim 1, wherein the receptacles have an inner diameter that is about 1.25, 1.50 and 1.75 inches in diameter.

6. The coin holder device of claim 1, wherein there are 20 to 30 receptacles arranged in series in rows and/or columns on each transparent front sheet.

7. The coin holder device of claim 6, wherein the backer sheet is opaque, has a thickness of less than 0.5 millimeters, and the first major surface of the backer sheet is white and the coin indicia is black or blue.

8. The coin holder device of claim 1, wherein the front sheet comprises a vacuum-molded plastic and includes a molded border, and wherein the thickness of the transparent front sheet is 0.025 inches to 0.04 inches thick, not including bends in the molded plastic front sheet.

9. The coin holder device of claim 8, wherein the outer diameter of the receptacles have a size that creates a friction fit with a coin capsule having an outer diameter of about 1.25, 1.5 and/or 1.75 inches.

10. The coin holder device of claim 1 wherein the one or more protuberances retain the backer sheet in mating contact with the front sheet.

11. The coin holder device of claim 1, wherein the receptacles are cylindrically shaped and the one or more protuberances comprise a continuous ring that extends 360° around the circumference of the receptacle.

12. The coin holder device of claim 1, wherein the receptacles are arranged in rows or columns and are generally cylindrical in shape, each receptacle being sized to frictionally receive a coin capsule.

13. The coin holder device of claim 12, wherein the backer sheet is opaque, has a thickness that allows the backer sheet to be passed through a printer, and the color of the first major surface of the backer sheet is different from the color of the coin indicia.

14. The coin holder device of claim 13, wherein front sheet comprises clear plastic, and wherein the backer sheet has a thickness that is less than 0.5 millimeters and is greater than 0.3 millimeters.

15. The coin holder device of claim 12, wherein the front sheet comprises clear plastic, and wherein the first major surface of the backer sheet can be placed in face-to-face contact with the second major surface of the front sheet.

16. The coin holder device of claim 15, wherein the one or more protuberances allow for the backer sheet to be joined to the front sheet such that the backer sheet and front sheet will not be separated under normal use and handling unless desired to be separated.

17. The coin holder device of claim 1, wherein the one or more protuberances comprise two or more protuberances positioned on opposite sides of each receptacle.

18. A binder that comprises: (a) a book that has front and back hinged covers and two or more rings disposed generally centrally between the front and back covers; and (b) a plurality of coin holder devices of claim 1, which coin holder devices have two or more holes along an inward edge and are joined to the binder by having each ring pass through one of the two or more holes.

19. The binder of claim 18, containing 3 to 6 coin holding devices within the binder between opposing front and back covers.

20. A coin holder device that comprises:
   (a) a transparent plastic front sheet that has first and second major surfaces and that contains a series of receptacles arranged in rows or columns, wherein the receptacles are generally cylindrical in shape and are recessed into the front sheet so as to project out from the second major surface of the front sheet; and
   (b) an opaque backer sheet that has first and second major surfaces and a series of openings located therein, the openings corresponding to the location of the receptacles, the backer sheet being able to be removably positioned over the receptacles so that the second major surface of the front sheet is juxtapositioned against the first major surface of the backer sheet, the backer sheet further comprising coin indicia proximate one or more of the openings on the first major surface, the coin indicia being visible through the transparent front sheet and being indicative of a coin that may be placed in the receptacle, wherein the backer sheet has a thickness that allows the backer sheet to be passed through a printer, and the color of the first major surface of the backer sheet is different from the color of the coin indicia, and wherein the receptacles comprise one or more protuberances that allow for the backer sheet to be joined to the front sheet such that the backer sheet and front sheet are not separable under normal use and handling unless desired to be separated and allowing for the backer sheet to be held in face-to-face contact with the second major surface of the front sheet.

* * * * *